E. J. RITTY.
LEVEL.
APPLICATION FILED APR. 15, 1914.
1,111,706.
Patented Sept. 22, 1914.
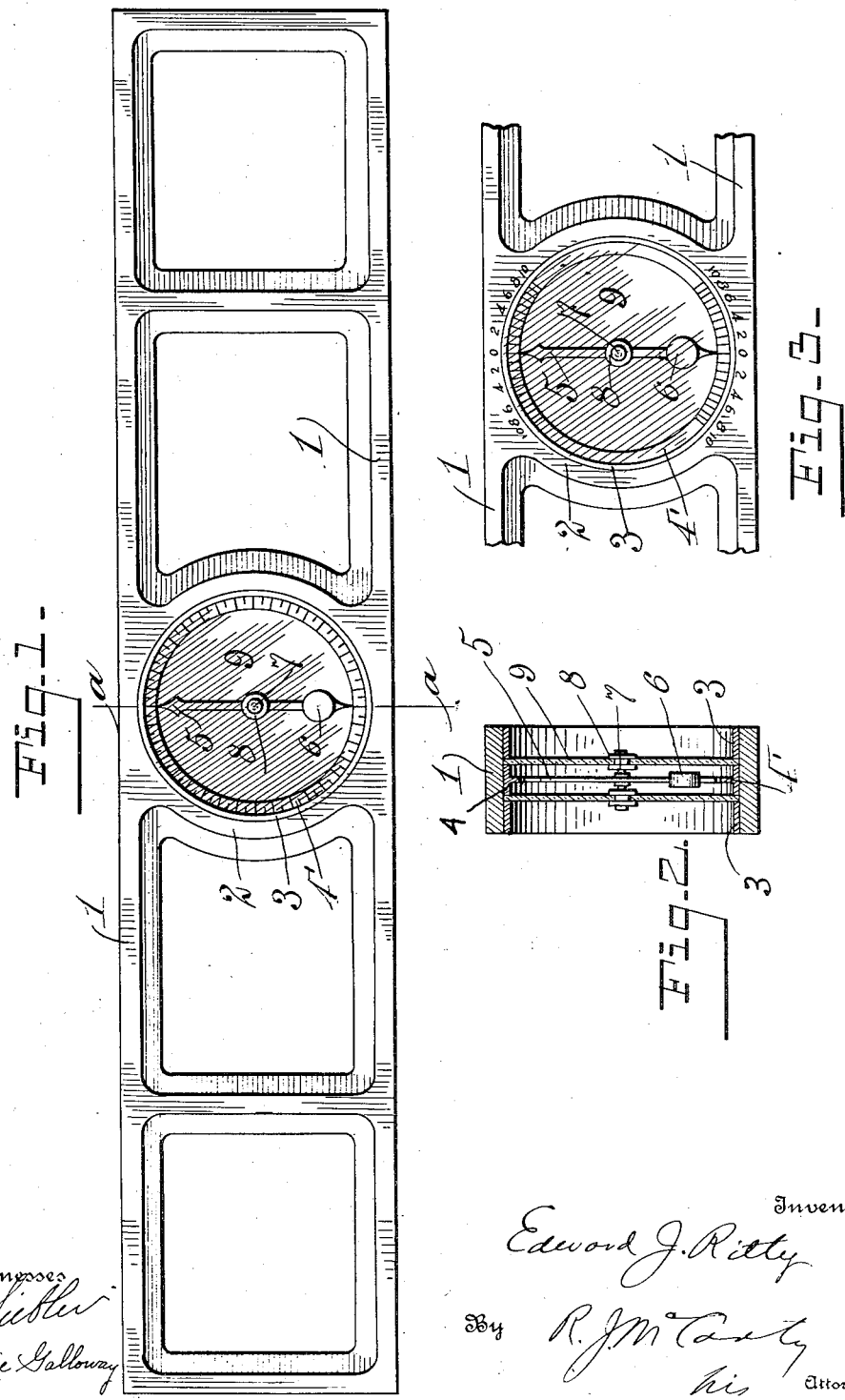

UNITED STATES PATENT OFFICE.

EDWARD J. RITTY, OF DAYTON, OHIO, ASSIGNOR OF ONE-HALF TO LEO J. RITTY, OF DAYTON, OHIO.

LEVEL.

1,111,706.  Specification of Letters Patent.  Patented Sept. 22, 1914.

Application filed April 15, 1914. Serial No. 832,098.

*To all whom it may concern:*

Be it known that I, EDWARD J. RITTY, a citizen of the United States, residing at Dayton, in the county of Montgomery and State of Ohio, have invented certain new and useful Improvements in Levels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in levels and has for its object to provide a level of efficient and inexpensive construction.

A further object is to provide a level which is capable of indicating lineal measurements as well as degrees of a circle, as will hereinafter more fully appear from the following description in connection with the accompanying drawings.

Of said drawings, Figure 1 is an elevation of my improved level, Fig. 2 is a sectional view on the line $a-a$ of Fig. 1, and Fig. 3 is an elevation of the opposite side of the dial as shown in Fig. 1 with parts of the frame broken away the scale there shown being lineal indications.

The frame 1 may be constructed of metal as shown in the drawing with portions omitted to produce less weight. The central part of said frame has a circular opening for the reception of the indicator or dial ring 4 which is T-shaped in cross-section. The inwardly projected annular portion 4' of said ring has the marks on each side which may be the same to indicate degrees of a circle or one side may be marked to indicate angular measurements denoting inches to the foot. On each side of the ring 4 a glass disk 9 is placed and held in position by individual rings 3—3 which fit in the opening in the frame and hold said glass disks between them and the ring 4. The rings 3—3 are substantially the same thickness as the ring 4 in order that a view of the indicating portion 4' may not be obstructed in reading the device. The glass disks 9—9 are set in the opening in the frame far enough to protect them from breakage in manipulating the level. The circle degree marks as well as the lineal indications on the annular portion 4' of the ring 4 are clearly observable through either disk 3. Between the disks 3—3 and within the inner circumference of the ring 4, the pointer 5 is mounted to point to the indications on both sides of the annular portion 4'. A pivot 7 supports the pointer 5, said pivot being suitably mounted in the centers of the glass plates 9. The pointer 5 has one end weighted as at 6 to control the position thereof.

Having described my invention, I claim.

A level comprising a frame having a centrally disposed opening therein, a ring centrally disposed in said opening with an annular portion extending at a right angle to said ring and upon opposite sides of which portion scales are arranged denoting degrees of a circle and lineal measurements respectively, transparent disks provided with axial openings and set in said opening on each side of said ring and abutting with the circumferential edges thereof, a pointer having its shaft extending through said axial openings, and individual retaining rings arranged in said opening on the outside of said disks and abutting thereagainst, said retaining rings being each of a thickness corresponding to the thickness of the ring of the indicator, substantially as described.

In testimony whereof I affix my signature, in presence of two witnesses.

EDWARD J. RITTY.

Witnesses:
R. J. McCARTY,
MATTHEW SIEBLER.